(12) United States Patent
Ayrle

(10) Patent No.: US 6,499,267 B1
(45) Date of Patent: Dec. 31, 2002

(54) RODS SECURED IN ANCHORAGE BY AT LEAST ONE OF ORGANIC AND INORGANIC MORTAR COMPOSITION

(75) Inventor: Thomas Ayrle, Schwabmünchen (DE)

(73) Assignee: Hilti Aktiengesellschaft, Schaan (LI)

( * ) Notice: Subject to any disclaimer, the term of this patent is extended or adjusted under 35 U.S.C. 154(b) by 73 days.

(21) Appl. No.: 09/725,328

(22) Filed: Nov. 28, 2000

(30) Foreign Application Priority Data

Nov. 19, 1999 (DE) .......................................... 199 55 684

(51) Int. Cl.[7] .......................... E04B 1/38; E21D 20/02; F16B 13/04
(52) U.S. Cl. ........................ 52/698; 52/704; 405/258.4; 405/259.5; 411/33; 411/82; 411/258
(58) Field of Search .................. 52/698, 405.1, 52/410, 411, 699, 704; 411/82, 258, 930, 33, 71–72; 405/259.5, 259.1, 259.4, 258.1

(56) References Cited

U.S. PATENT DOCUMENTS

| | | | | |
|---|---|---|---|---|
| 13,496 A | * | 8/1855 | Rohmer | 403/373 |
| 665,705 A | * | 1/1901 | Summerer | 16/38 |
| 4,193,246 A | * | 3/1980 | Schiefer et al. | 411/33 |
| 4,305,687 A | * | 12/1981 | Parker | 405/259.3 |
| 4,402,639 A | * | 9/1983 | Kessler | 411/51 |
| 4,523,880 A | * | 6/1985 | Isler | 405/259.1 |
| 4,678,383 A | * | 7/1987 | Bergner | 411/32 |
| 4,806,053 A | * | 2/1989 | Herb | 405/259.3 |
| 5,059,073 A | * | 10/1991 | Revol et al. | 411/342 |
| 5,211,512 A | * | 5/1993 | Frischmann et al. | 405/259.4 |
| 5,232,322 A | * | 8/1993 | Regensburger | 411/33 |

FOREIGN PATENT DOCUMENTS

| | | | |
|---|---|---|---|
| DE | 1475108 | * | 4/1969 |
| EP | 0979654 | * | 8/1998 |

* cited by examiner

*Primary Examiner*—Lanna Mai
*Assistant Examiner*—Winnie Yip
(74) *Attorney, Agent, or Firm*—Sidley Austin Brown & Wood, LLP

(57) ABSTRACT

A tie rod, for insertion into an anchorage where it is secured by at least one of an organic and inorganic mortar composition has an axially extending shaft (2) with an axially extending connection section (3) and an axially extending anchoring section (4). The anchoring section (4) has at least two conically shaped members, one following the other in the axial direction and with the outside diameter of the members increasing toward a leading end of said anchoring section. The conically shaped members (6, 7) include a first cone (6) at the leading end of the shaft, inserted first into the anchorage and secured to the shaft (2) so that it cannot be shifted axially. At least one second cone (7) separate from the first cone can be slipped onto the anchoring section (4) of the shaft so that it can be shifted to a limited axial extent along the anchoring section (4).

16 Claims, 2 Drawing Sheets

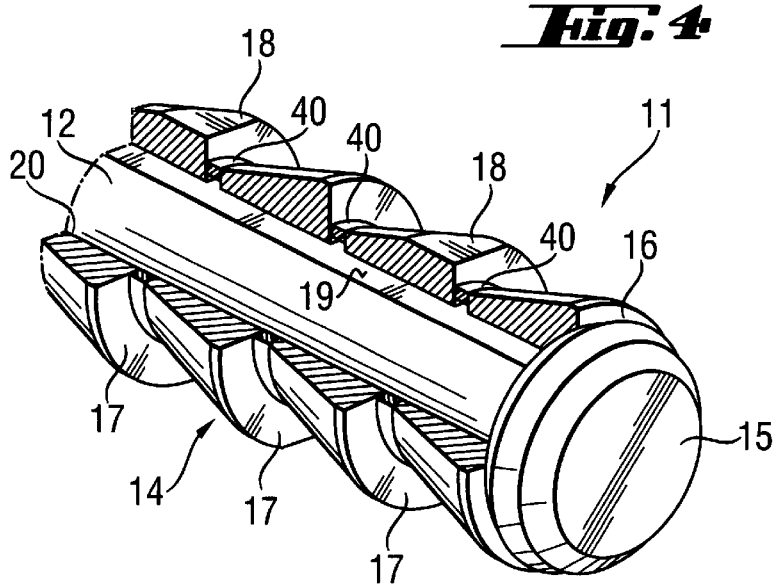
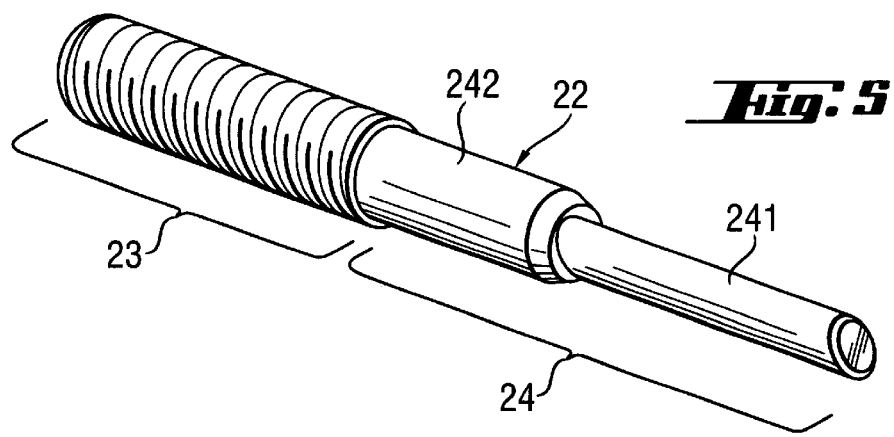
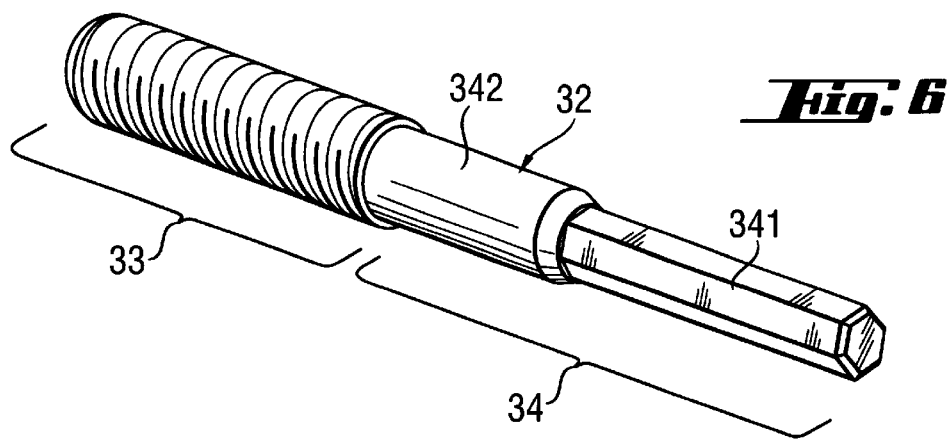

RODS SECURED IN ANCHORAGE BY AT LEAST ONE OF ORGANIC AND INORGANIC MORTAR COMPOSITION

BACKGROUND OF THE INVENTION

The present invention is directed to a tie rod secured in an anchorage by at least one of an organic and inorganic mortar composition. The tie rod is formed of a shaft, inserted into the anchorage, having a connecting section and an anchoring section with conically shaped members on the anchoring section.

Aside from classical fastening techniques where the attachments are formed by expansion anchors or undercut systems anchored positively or non positively in a borehole, chemical fastening techniques are also known in the state of the art where a tie rod is inserted into a borehole filled with a mortar composition and is fixed after the mortar composition has hardened or cured. Such composite anchoring systems have the advantage that they are largely free of expanding pressure and, therefore, permit smaller axial and edge distances in the anchorage. For fastening heavy loads, composite anchoring systems are known in which a multi-component organic and/or inorganic mortar composition is filled in a previously prepared borehole. Initially, the components of the mortar composition are maintained separate from one another in glass or plastic containers. A tie rod, as disclosed in EP-B-0 356 425, is driven into the borehole and at the same time, rotates about its longitudinal axis. As it is introduced, the tie rod destroys the containers holding the components of the mortar composition. By rotating the tie rod, the mortar composition is mixed more or less intimately and the shattered container is further comminuted.

Composite anchoring systems are also known where the mortar composition is premixed outside the borehole and then introduced into it. Such composite anchoring systems, which are sold by the assignee, are used predominately for fastenings in brick walls, especially formed of hollow chamber bricks. The mortar composition, usually comprising two reactive components, is discharged by an expelling device from individual containers holding the reactive components and mixed in a device located upstream of the outlet opening of the device and injected into a borehole prepared in the brick wall. To improve the distribution of the already premixed mortar composition and to prevent the mortar composition from flowing away into a chamber in the brick containing the borehole, usually the borehole is equipped with a sleeve provided with openings. To insure that the sleeve equipped borehole is filled completely, the mortar composition is injected in an prescribed filling procedure from the bottom or base to the top. Next, a tie rod is inserted into the borehole containing the injected mortar. After the curing of the injected mortar, the tie rod is fixed in the borehole. Recently, injected mortar has been used to an increasing extent for anchorage in solid materials, such as concrete, rock and wood.

Where the anchorage is formed in a broken base material, in moist boreholes, or boreholes from which the drilled material has been only inadequately removed, anchorages of the tie rod with organic and/or inorganic composite mortars or with injection mortars have an inferior load shifting behavior. In EP-B-0 356 425 an organic composite mortar is supplied in glass cartridges and the tie rods have several consecutively arranged cones in the anchoring section formed from the shaft of the tie rod. During axial displacement of the tie rod under tensile load, the cones, arranged consecutively, are intended to afford a post spreading in the borehole. In the case of known tie rods with multiple cones, the load is introduced into the base material of the anchorage by spreading pressure, which the cones exert under tensile load over the mortar composition in the anchoring base. In broken concrete, it may happen that the load is introduced very unevenly, plus the cones, closer to the anchoring surface, exert a greater spreading pressure than the cones located further inwardly. In such an anchorage, in the case of tensile loads, there is the danger that the concrete spalls in the region close to the anchorage surface, and the load carrying capability of the concrete is only incompletely used.

SUMMARY OF THE INVENTION

Therefore, a primary object of the present invention is to eliminate such disadvantages of tie rods in the state of the art. A tie rod is provided which enables loads to be introduced more uniformly into the anchorage base, whereby the load carrying capability of the concrete is better utilized. At the same time, the tie rods are of a simple form and inexpensive to manufacture.

The object of the present invention is to provide a tie rod with conically shaped members on the leading end of the tie rod shaft. Preferred variations and/or advantages for the developments of the tie rod are set forth in the dependent claims. The present invention is intended for anchorages where the tie rod is secured with organic and/or inorganic mortar compositions and has a shaft with a connecting section at one end and an anchoring section at the other. The anchoring section has at least two conically shaped members disposed consecutively in the axial direction and the diameter of such members increases in the direction toward the first or leading end of the tie rod shaft. The conically shaped members are formed of a first end cone secured on the shaft so that it cannot be displaced or shifted axially. A second cone follows the first end cone and is a separate member which can be slipped onto the anchoring section and displaced to a limited axial extent along the anchoring section.

In accordance with the present invention, the tie rod affords a better introduction of the load. In tie rods known in the state of the art, with a number of conically shaped members, formed from the shaft and disposed consecutively in the axial direction, the load is usually distributed from the region close to the surface of the anchorage to the bottom of the borehole. On the contrary, the tie rod in accordance with the present invention affords a very opposite distribution. The axially fixed first end cone, in combination with at least one and preferably several additional cones, which are axially displaceable, insures that the load is always introduced starting from the base of the borehole. As a function of their axial displacability, the load is also distributed over the remaining cones. Overall, a controllable and more uniform distribution of the load from the cones over the mortar into the anchorage base results.

At times it may be necessary to insert the tie rod with the cones in a specific orientation into the borehole. To retain the orientation in the anchored state, the cones are secured against twisting relative to the anchoring section. Twisting is prevented by a positive connection between the tie rods and the cones. In a preferred embodiment of the invention, the anchoring section has a cross section deviating from the circular to achieve this purpose and preferably the cross section is polygonal.

To maintain the diameter of the borehole so that it is not excessively large in relation to the connecting section diameter of the tie rod, the anchoring section, carrying the cones, has a diameter smaller than the diameter of a transition region between the connecting section and the anchoring section. The transition section between the smaller diameter section and the connecting section has the diameter of the tie rod blank. Preferably, the ratio of the outside diameter of the transition section to that of the reduced diameter anchoring section is in a range of about 1.2 to about 1.35. The first end cone at the front of the anchoring section, can be a separate part as are the axially displaceable cones. The first end cone can be slipped or screwed onto the tie rod and then connected to it, so that it cannot be shifted axially. For example, the first end cone can be connected to the shaft by a positive connection, such as riveting, swaging or by threading, or by a connection, such as welding, soldering, gluing and the like. In one embodiment of the invention, advantageous from a manufacturing point of view, the first end cone is constructed as one piece with the anchoring section. In this arrangement, the remaining axially displaceable cones are slipped onto the shaft and the first end cone is integrally molded onto the leading end of the shaft, for example, by swaging, radial riveting and the like.

Where separate cones are provided, which can be slipped onto the anchoring section of the tie rod, there is the possibility of constructing the cones from a material different from the shaft. This affords the opportunity of using different manufacturing processes for the shaft and for the cones. If different materials are selected for the shaft and the cones, it is possible that the tie rod be formed of a stainless steel while the cones are produced from a more easily moldable steel. Moreover, the cones need not all consist of the same material. In its anchoring section, the tie rod may have cones of different materials to achieve loads of different magnitudes at different depths in the borehole and so that the load introduction is adapted, for example, to an anchoring base which is very inhomogeneous over its depth.

In connection with an introduction of the load adapted to the anchorage base, it is advantageous if the tie rod is equipped in the anchoring section with cones having different external diameters and/or cone angles The axial passage of forces developed during a tensile load from one cone to the next can be influenced by axially cushioned or axially elastic intermediate elements, which can be slipped on the anchoring section of the tie rod between the cones. As an example, a larger load can be assigned over the targeted distribution forces to the cones located in the depth of the borehole, in order to make better utilization of the load carrying capability of the concrete forming the anchorage. The intermediate elements can be metallic elements in the form of discs or springs, such as spring washers. In a preferred embodiment of the invention, the intermediate elements are elastic, plastic disks. The passage of the force can be controlled by the selection of the plastic, the modulus of elasticity and the thickness of the plastic disks. The load is passed on less and later if the modulus of elasticity is lower and/or the thickness of the plastic disks is larger. Instead of plastic disks of different thickness, and it is possible to vary the number of plastic disks disposed between the cones.

The number of cones arranged along the anchoring section which can be shifted axially, depends on the length of the anchoring section. The arrangement of cones along about ½ to about ⅔ the length of the anchoring section of the tie rod has proven to be advantageous. In principle, there is no upper limit to the number of cones disposed along the anchoring section. On the basis of manufacturing considerations, however, it has proven to be advantageous that the number of cones including the first end cone, does not exceed 10.

To prevent the tie rod from rotating in the hole when a component part is connected and fastened to it, at least some of the cones may be provided on their radially outer periphery with one or more flat surfaces. The flat surfaces make it easier to insert the tie rod into the borehole filled with the mortar composition. The mortar composition can flow at the flat surfaces and the tie rod is better embedded in the mortar.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

BRIEF DESCRIPTION OF THE DRAWINGS

FIG. 4 is an enlarged axially extending view of part of a modified tie rod, illustrated partly in section; and FIGS. 5 and 6 are two axially extending perspective views of two embodiments of a shaft for the tie rod.

DETAILED DESCRIPTION OF THE INVENTION

Figure 1:
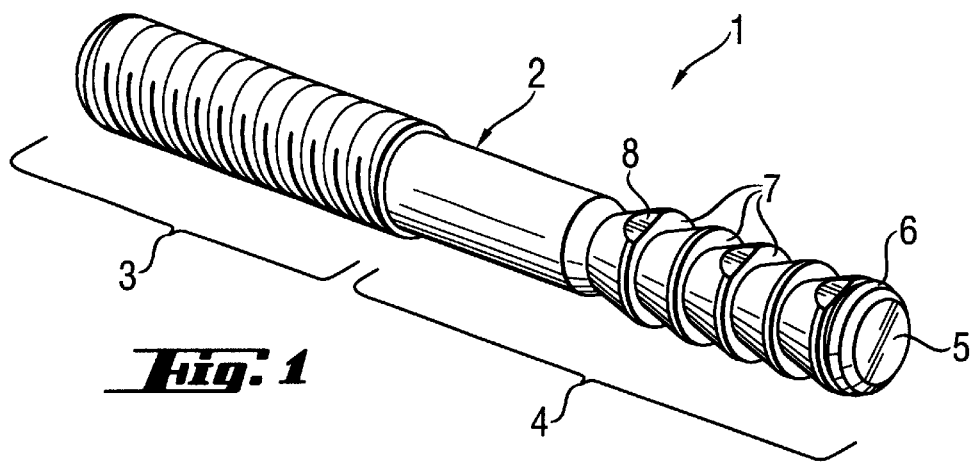
FIG. 1 is an axially extending perspective view of a first example of a tie rod embodying the present invention.

A tie rod 1 is shown in FIG. 1. The tie rod 1 has an axially extending shaft 2. As viewed in FIG. 1, the tie rod 1 has a leading first end on the right to be inserted first into an anchorage and a trailing second end on the left. The shaft 2 has a connecting region 3 with an external thread extending from the trailing second end to an axially extending anchoring section 4 intended to be inserted into a borehole filled with an organic and/inorganic mortar composition. Approximately half of the axial extent of the anchoring section is provided with conically shaped members 6, 7. The diameter of the conically shaped members increases in the direction toward the leading first end 5 of the anchoring section 4. The conically shaped members include a first end cone 6 fixed to the shaft 2 of the tie rod 1 so that it cannot be displaced axially. The first end cone 6 is fixed positively with the shaft 1 by riveting, swaging or by a threaded connection. In addition, the fixed connection between the first end cone 6 and the shaft can be effected by joining, such as by welding, soldering, gluing and the like. The first end cone can be constructed in one piece with the shaft 2. Following the first end cone are second cones 7, adjoining the first end cone 6 and slipped loosely onto the shaft 2. The second cones 7 are connected positively and/or non positively in the axially direction of the shaft and can be shifted axially, relative to the anchoring section 4. Flat surfaces 8 on the outside periphery of the individual second cones 7 and on the first end cone 6 serve to prevent twisting of the tie rod 1 and act as an aid in the flow of the mortar.

Figure 2:
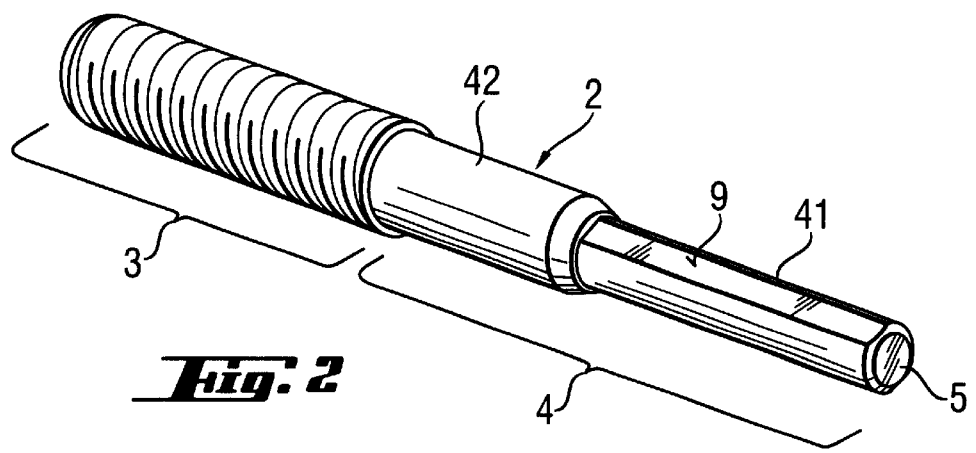
FIG. 2 is another perspective view of a shaft of the tie rod.

In FIG. 2 the shaft 2 of the tie rod 1 in FIG. 1 is shown. The connecting section 3 has an external thread and it is located rearwardly in the insertion direction into the anchorage. As can be noted in FIG. 2, the anchoring section 4 has a section 41 with a smaller diameter than the remainder of the anchoring section and the cones 7 can be slipped onto it. The ratio of the outside diameter of a transition section 42 between the cone section 41 and the connecting region 3 is in the range of about 1.2 to about 1.5 with the cone section. The lesser diameter of the section 41 of the anchoring section 4 has a cross section which deviates from the circular. As an example, an axially extending flat surface 9 is formed along the axial length of the section 41 from the right hand end of the transition section up to the leading first end 5 of the shaft 2. The axially extending flat surface 9 of the section 41 of the anchoring section 4, having the smaller diameter, affords an interlocking action preventing twisting of the cones 7 slipped on and assists the mortar composition to flow within the borehole.

Figure 3:
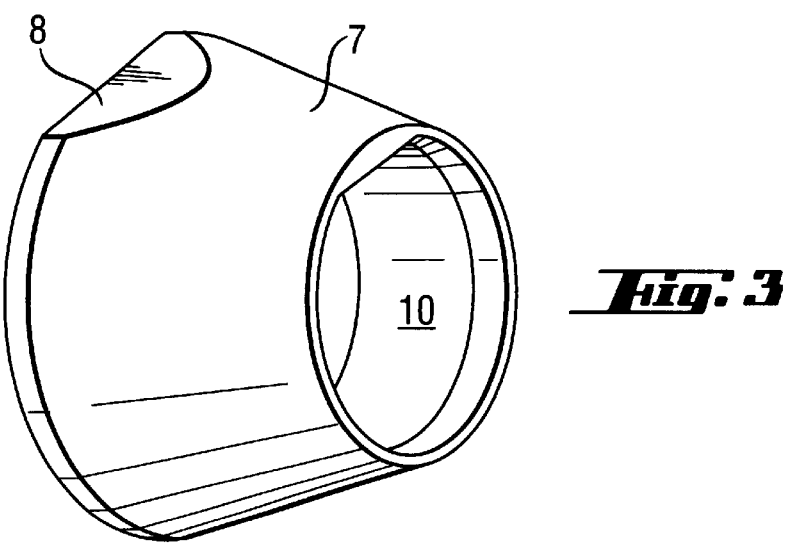
FIG. 3 is an enlarged perspective view of a cone as shown in FIG. 1.

In FIG. 3 a cone 7 is shown. The cone 7 has a conical shape with a borehole 10 having a flat surface corresponding to the axially extending flat surface 9 in the anchoring section, note FIG. 2. By these interengaging means, the cone 7 is slipped onto the anchoring section 41 and is fixed in the circumferential direction by the interlocking relationship. The axial displacability of the cone 7 along the anchoring section is not affected. The flat surface 8 on the outer periphery of the cone 7 prevents twisting of the tie rod in the borehole filled with the mortar composition. The flat surfaces 8 on the outer periphery of the cones 7 can be arranged in any convenient manner.

Another example of a tie rod 11 embodying the present invention is illustrated in FIG. 4. Only the anchoring section of the tie rod 11 is shown, partially in section, and has a first end cone 16 at the leading first end 15 followed by axially displaceable second cones 17. The flat surfaces 18 on the outer periphery of the second cones 17 prevent twisting of the tie rod 11. Due to the interlocking action, the second cones 17 and the first end cone 16 are prevented from rotating relative to the anchoring section 14. Accordingly, the anchoring section 14 has an axially extending flat surface 19 interacting with the corresponding boreholes 20 of the second cones 17 and the first end cone 16. Elastic intermediate elements 40 are positioned between the second cones 17 and are formed as sleeve shaped plastic parts. The intermediate elements 40 form the boundary of and control the axial displacability of the cones 17.

In FIG. 5 an axially extending perspective side view displays a slightly modified shaft 22. The connecting section 23 has an external thread. The anchoring section 24 has a section 241 for the cones, not shown, and has a reduced outer diameter. The transition section 242 is located between the reduced diameter section 241 and the connecting section 243. The cross section of the reduced diameter section 241 is different from a circular shape and, as shown, is elliptical. It is self evident that the corresponding boreholes of the cone and, optionally, of the first end cone, have an elliptical shape.

In FIG. 6 another embodiment of a tie rod in accordance with the present invention is illustrated and has a shaft 32 with an axially extending connecting section 33 provided with an external thread, and an adjoining axially extending anchoring section 34. The anchoring section 34 is divided into a transition section 342 and a reduced diameter section 341 for receiving cones. The reduced diameter section 341 of the anchoring section 34 has the shape of a hexagon. The borehole of the cones and optionally also of the first end cone also have a hexagonal cross section whereby the cones and the first end cone can be slipped onto the anchoring section 34. The interlocking action of the hexagonal cross section of the anchoring section 34 with the internal hexagons of the boreholes of the cones or of the first end cone prevents twisting.

What is claimed as new and desired to be protected by letters patent is set forth in the appended claims:

What is claimed is:

1. A tie rod for insertion into an anchorage, where it is secured by at least one of an organic and inorganic mortar composition, comprising an axially extending shaft (2; 12; 22; 32) having a leading first end to be inserted into the anchorage and a trailing second end, said shaft comprising an axially extending connecting section (3; 13; 23; 33) extending from said second end toward said first end and an axially extending anchoring section (4; 14; 24; 34) having at least an anchoring part having a uniform cross-section transverse of the axis of said shaft and axially extending from said first end toward said connecting section, said connecting section having a diameter larger then a diameter of said anchoring part, conically shaped members (6, 7; 16, 17) positioned on said anchoring part one following the other in the axial direction, said conically shaped members each having an outside diameter increasing in the axial direction toward said first end, said conically shaped members comprising a first end cone and at least two second cones, said first end cone being separably fixed to said leading first end and said at least two second cones being slidably positionable on said anchoring section between said first end cone and said connecting section and being axially displaceable to a limited extent along the anchoring section, and said second cones (17) are separated from one another in the axial direction by at least one of axially cushioned and axially elastic intermediate elements (40).

2. A tie rod, as set forth in claim 1, wherein the number of said second cones (7, 17) located on said anchoring section (4, 14) is greater than two.

3. A tie rod, as set forth in claim 2, wherein a number of said second cones (7, 17) are secured against rotation by a shaped connection between said shaft (2, 12) and said second cones (7, 17).

4. A tie rod, as set forth in claim 3, wherein said anchoring part (4; 14; 24; 34) has a cross section different from a circular shape.

5. A tie rod, as set forth in claim 4, wherein said cross section is polygonal.

6. A tie rod, as set forth in claim 1, wherein said second cone (7, 17) is secured against rotation relative to said shaft (2, 12).

7. A tie rod, as set forth in claim 1, wherein said anchoring part (41, 241, 341) of said anchoring section (4; 24; 34) having said conically shaped members thereon has a diameter smaller relative to a cylindrical transition section (42, 242, 342) extending axially between said anchoring part having the conically shaped members thereon and said connecting section (3, 23, 33) with the ratio of the diameter of said cylindrical transition section (42, 242, 342) to a outside dimension of said anchoring part being in the range of about 1.2 to about 1.35.

8. A tie rod, as set forth in claim 7, wherein said first end cone adjoining the first end of said shaft is secured to with said anchoring section by one of swaging, and radial riveting.

9. A tie rod, as set forth in claim 1, wherein said second cones are formed of a material different from a material forming said shaft.

10. A tie rod, as set forth in claim 1, wherein said intermediate elements (40) are elastic plastic discs.

11. A tie rod, as set forth in claim 10, wherein said elastic plastic discs have at least one of different thicknesses and are disposed in different numbers between said second cones (17).

12. A tie rod, as set forth in claim 1 wherein said second cones (7; 17) extend axially for about ½ to about ⅔ of the axial length of said anchoring section (4, 14).

13. A tie rod, as set forth in claim 12, wherein the number of said second cones (7, 17) and said first end cone (6, 16) is not greater than ten.

14. A tie rod, as set forth in claim 1, wherein at least some of said second cones (7; 17) are provided with flat surfaces at their radial outer periphery.

15. A tie rod, as set forth in claim 14, wherein said flat surfaces are located at the greater diameter of the outer radial periphery of said cones (7, 17).

16. A tie rod, as set forth in claim 14, wherein said anchoring section has an axially extending flat surface (19) and said conically shaped members (6, 7, 16, 17) have interior flat surfaces arranged to engage said flat surface (19) on said anchoring section.

* * * * *